UNITED STATES PATENT OFFICE.

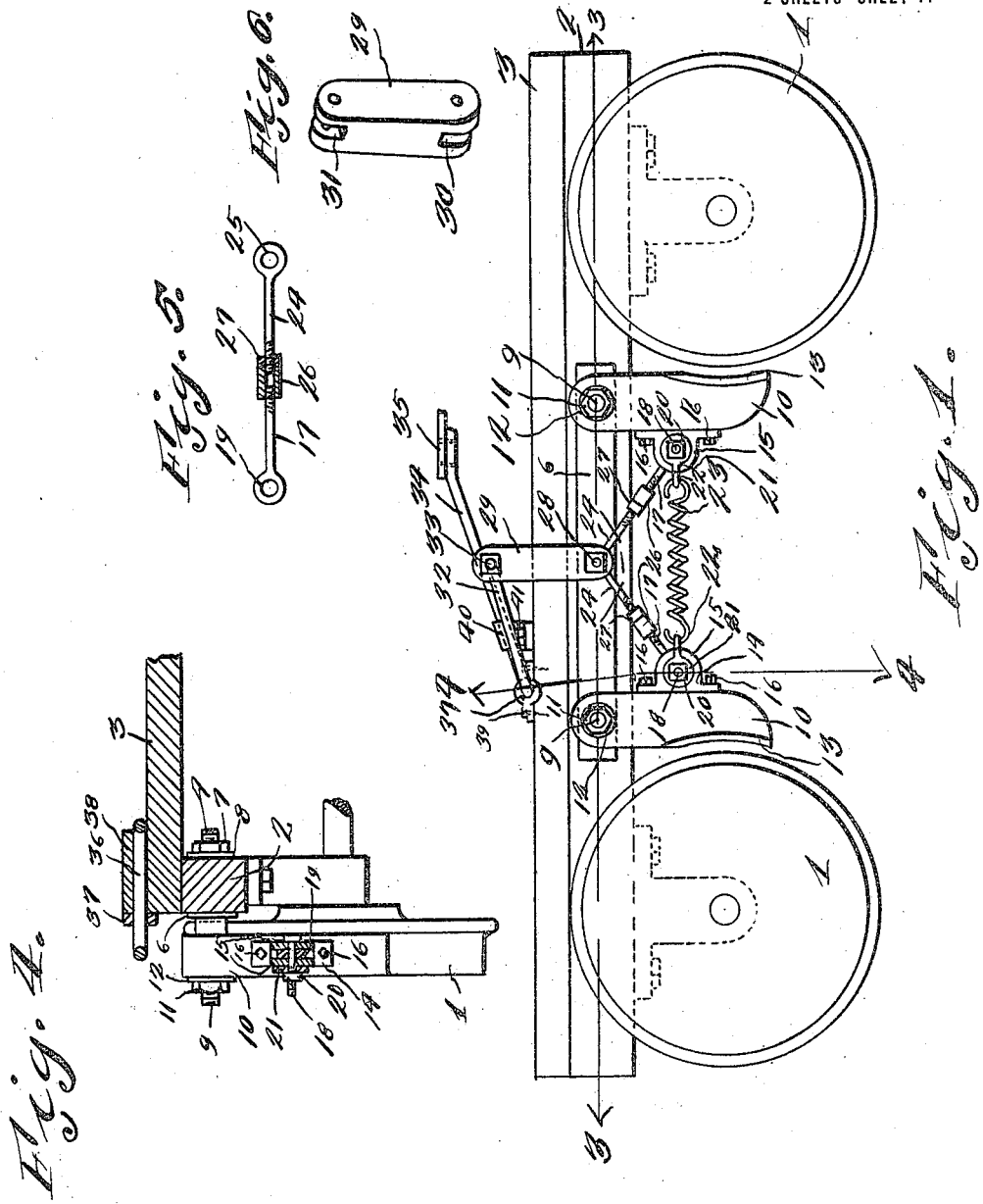

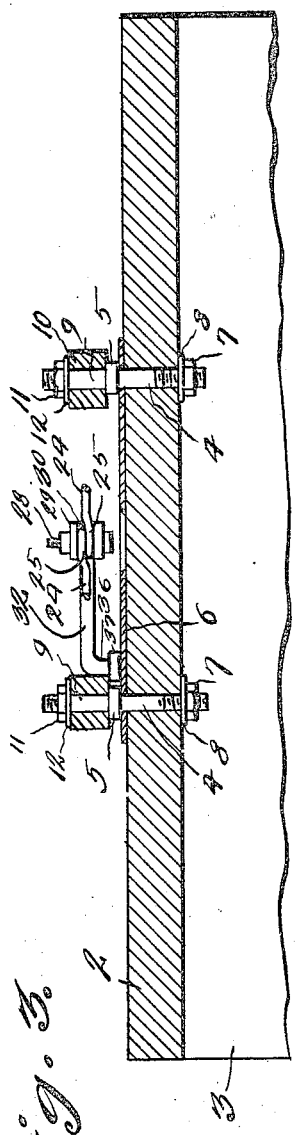

EMIL PLATH, OF MAZA, NORTH DAKOTA.

CAR-BRAKE.

1,241,147.

Specification of Letters Patent. Patented Sept. 25, 1917.

Application filed April 12, 1917. Serial No. 161,463.

*To all whom it may concern:*

Be it known that I, EMIL PLATH, a citizen of the United States, residing at Maza, in the county of Towner, State of North Dakota, have invented a new and useful Car-Brake; and I do hereby declare the following to be a full, clear, and exact description of the invention, such as will enable others skilled in the art to which it appertains to make and use the same.

The invention relates to brakes for railroad motor cars, such as are used by the section crews of railroads.

One of the objects of the invention is to provide for such motor cars a brake adapted to be operated by the pressure of the foot.

A further object is to provide a brake mechanism capable of exerting a maximum braking effort on the car wheels with a minimum pressure exerted by the foot.

Other objects will appear in the detailed description which follows.

The invention consists broadly of brakes pivoted to the side sill of the car and so connected with a foot lever as to permit them to be brought into contact with the car wheels, a spring connected between the brakes holding them normally away from the wheel.

Should the drawings and specification vary to the extent of having the one set forth some structure that is not defined by the other, the right to such structure is claimed as though it had been fully treated by both.

The drawings illustrate but one embodiment of the invention but to this embodiment it is not to be restricted. The right is reserved to make any changes or alterations suggested by the demands of practice, provided such changes or alterations are compatible with the spirit of the appended claims.

The same numerals of reference designate the same parts in all of the several figures of the drawings, wherein:

Figure 1 is a view in side elevation of a conventional car, showing the improved brake attached.

Fig. 2 is a top plan of the structure shown in Fig. 1.

Fig. 3 is a section on the line 3—3 of Fig. 1.

Fig. 4 is a section on the line 4—4 of Fig. 1.

Fig. 5 is a detail partly in section of one of the adjustable eye bars connected with the brakes.

Fig. 6 is a detail perspective of the bar connecting the foot lever with the eye bars.

In the drawings, a conventional car is shown having the wheels 1, the side sills 2 and the platform 3. The improved brake is designed for use on one side of the car only. Therefore, only so much of the car is shown as is necessary for a complete understanding of the invention. It is obvious, however, that the device may be applied to operate with wheels on both sides of the car without departing from the spirit of the invention.

Stud bolts are affixed to the side sill 2 by having their shanks 4 penetrate holes bored therein. Nuts 7 in conjunction with the washers 8 serve to secure the stud bolts to the side sills by drawing the shouldered portions 5 of the former against the plate 6. On the conventional car the sill 2 would in all likelihood be made of wood. The plate 6 is designed to be made of metal and thus serves to prevent the shoulder portions 5 from being drawn into the wood when the nuts 7 are tightened. Again, the plate 6 being continuous from one stud bolt to the other precludes the possibility of the bolts assuming diagonal positions with respect to the face of the sill 2 when the nuts 7 are tightened. Were ordinary washers used under the shoulders 5, the tightening of the nuts 7 would, in all likelihood, cause these washers to be embedded in the sill and might result in throwing the stud bolts out of perpendicular alinement with respect to the sills.

The shanks 9 of the stud bolts are adapted to receive the upper ends of the brakes 10, so that the latter may be afforded pivotal movement thereon. Suitable nuts 11 and washers 12 secure the brakes on the shanks 9.

Brake shoes 13 are designed to be attached to the brakes 10 by any acceptable conventional means.

Each brake has attached thereto, by lag screws or the like 16, a plate 14 with integrally extending ears 15 between which an eye 19 of the eye bar 17 pivotally engages the bolt 18 that passes through holes formed in these ends. A nut 20 threads on to the bolt 18 and secures it in the ears 15. This nut also secures a washer 21 on the bolt 18, this washer having an integral hook 22 connected with it.

A spring 23 is attached between the two hooks 22 of the two brakes 10 and serves to keep the latter normally away from the car wheels 1.

Eye bars 17 are threaded at the ends remote from the eyes 19, these threads being preferably left-hand. The threaded sleeves 26 thread on to the bar 17 and connect these bars with the eye bars 24 whose ends are provided with right-hand threads. Locking sleeves 27 are threaded on to the eye bars 24 and are adapted to jam against the sleeves 26 to prevent the latter from turning. The eye bars 24 terminate in eyes 25 which are offset with respect to the length of the bars, both these eyes engaging pivotally the bolt 28 within the slot 30 of the connecting bar 29.

A slot 31 is formed in the upper end of the bar 29 and receives the ends of the leg 32 of the foot lever which leg is pivotally connected to the bar 29 by the bolt 33.

The leg 34 of the foot lever has a suitable plate 35 attached at its end by any acceptable means and this leg is integrally connected with the leg 32 by the transverse bar 36, the two legs and the bar 36 making the foot lever substantially U-shaped. An integral collar 37 is affixed to the transverse bar 36 and abuts on one end the bearing strap 38 which is attached to the platform 3 by suitable lag screws or the like 39. The leg 34 abuts the bearing strap 38 at the end opposite the collar 37 and the foot lever is thus prevented from lateral movement on the car platform 3.

It will be seen that the depression of the foot lever will operate to set the brakes 10 against the car wheels 1, the depression of the leg 34 resulting in a similar depression of the leg 32 and a consequent downward movement of the connecting bar 29 which, pressing on the eye bars, tends to force the brakes 10 into contact with the wheel. It will be seen that the eye bars are so arranged as to act on the brakes in the form of a toggle-joint and, remembering the great amount of force that can be exerted by means of a toggle-joint, the efficiency of this construction is apparent. The spring 23 operates to keep the brakes 10 normally out of contact with the wheel 1 and also to keep the foot lever raised, the latter having a limiting stop in the form of the strap 40 which straddles the leg 34 and is secured to the platform 1 by suitable lag-screws or the like 41. The eye bars connected with the brakes are adjustable and, as the brake shoes 13 wear, the brakes 10 may be adjusted toward the car wheel by means of these adjustable eye bars. The locking sleeves 27 are released from the sleeves 26, whereupon the latter may be turned to separate the ends of the bars 24 and 17, thus increasing the distance between the eyes 19 and 25 and serving to increase the length of the eye bars as a whole. After the required adjustment of the eye bars, the locking sleeves 27 can again be jammed against the sleeves 26 and the adjustment is thereupon retained intact. The advantage of having the eye bars adjustable is apparent when it is remembered that the brakes 10 can always be kept very close to the wheel 1 despite the wear on the shoes 13. The maintaining of the brakes 10 always at a uniform distance from the wheels 1 results in a uniform movement of the foot lever in setting the brakes, the foot lever not being required to move a greater distance to set the brake when the shoes are worn, as the adjustment of the eye bars moves the brakes closer to the wheels and compensates for the increased movement that would otherwise be required of the foot lever.

What is claimed is:

1. A foot brake for railroad motor cars comprising brakes designed for pivotal mounting on the car, a spring tensioned between the brakes, eye bars pivotally connected with the brakes, a connecting bar, the eye bars having a common pivotal connection therewith, and a U-shaped foot lever for pivotal mounting on the car, one leg of the foot lever pivotally engaging the connecting bar and the other leg of said lever being designed to receive the pressure of the foot.

2. A foot brake for railroad motor cars comprising brakes designed for pivotal mounting on the car, eye bars pivotally connected with the brakes and being adjustable in the direction of their lengths, a connecting bar, the eye bars having a common pivotal connection therewith, and a U-shaped foot lever for pivotal mounting on the car, one leg of the foot lever pivotally engaging the connecting bar and the other leg of said lever being designed to receive the pressure of the foot.

In testimony whereof I have signed my name to this specification in the presence of two subscribing witnesses.

EMIL PLATH.

Witnesses:
 HARRY LORD,
 G. P. PETERSON.

Copies of this patent may be obtained for five cents each, by addressing the "Commissioner of Patents. Washington, D. C."